United States Patent [19]
Henderson

[11] 3,944,162
[45] Mar. 16, 1976

[54] REEL FOR STORING BELTS OR THE LIKE

[75] Inventor: Cyril Henderson, Woodland Hills, Calif.

[73] Assignee: American Safety Equipment Corporation, Encino, Calif.

[22] Filed: Apr. 20, 1973

[21] Appl. No.: 353,211

[52] U.S. Cl............................................ 242/107.4 A
[51] Int. Cl.............................................. B65h 75/48
[58] Field of Search........ 242/107.4, 107.3, 107 SB, 242/107.6, 107.7; 297/386, 388; 280/150 SB; 74/575, 577, 578

[56] References Cited
UNITED STATES PATENTS

| | | | |
|---|---|---|---|
| 1,075,311 | 10/1913 | Beck | 192/43.2 |
| 2,923,492 | 2/1960 | Walpole et al. | 242/107.4 |
| 3,226,053 | 12/1965 | Petty | 242/107.4 |
| 3,240,510 | 3/1966 | Spouge | 242/107.4 |
| 3,332,720 | 7/1967 | Hansen | 242/107.4 |
| 3,489,367 | 1/1970 | Kovacs et al. | 242/107.4 |
| 3,787,002 | 1/1974 | Hayashi et al. | 242/107.4 |

Primary Examiner—Edward J. McCarthy
Attorney, Agent, or Firm—Poms, Smith, Lande & Glenny

[57] ABSTRACT

A reel on which seat belts are stored about a rotatable shaft. The reel includes spring means for retracting the belt and a ratchet tooth gear fixed for rotation with the shaft. Upon rapid unreeling of the belt off of the shaft, means which may be inertia responsive activates a pair of lockbars to engage the ratchet tooth gear and stop its rotation. Each lockbar includes a pawl tip and when one of the pawl tips is radially aligned with one of the tooth tips on the gear, the other of the pawl tips is aligned midway between a pair of adjacent gear teeth. When the lockbars are moved into engagement with the ratchet tooth gear, the combination of the two pawl tips and their orientation with respect to the teeth of the gear assures that at least one of the tips will be in proper position to engage the tooth gear should the other tip break off or not engage upon contact with the gear. Differential lever means may be provided for moving the pawl tips into engagement with the gear. This latter means thus forces one of the pawl tips into engagement with the gear should a first pawl tip slip or otherwise not engage.

14 Claims, 8 Drawing Figures

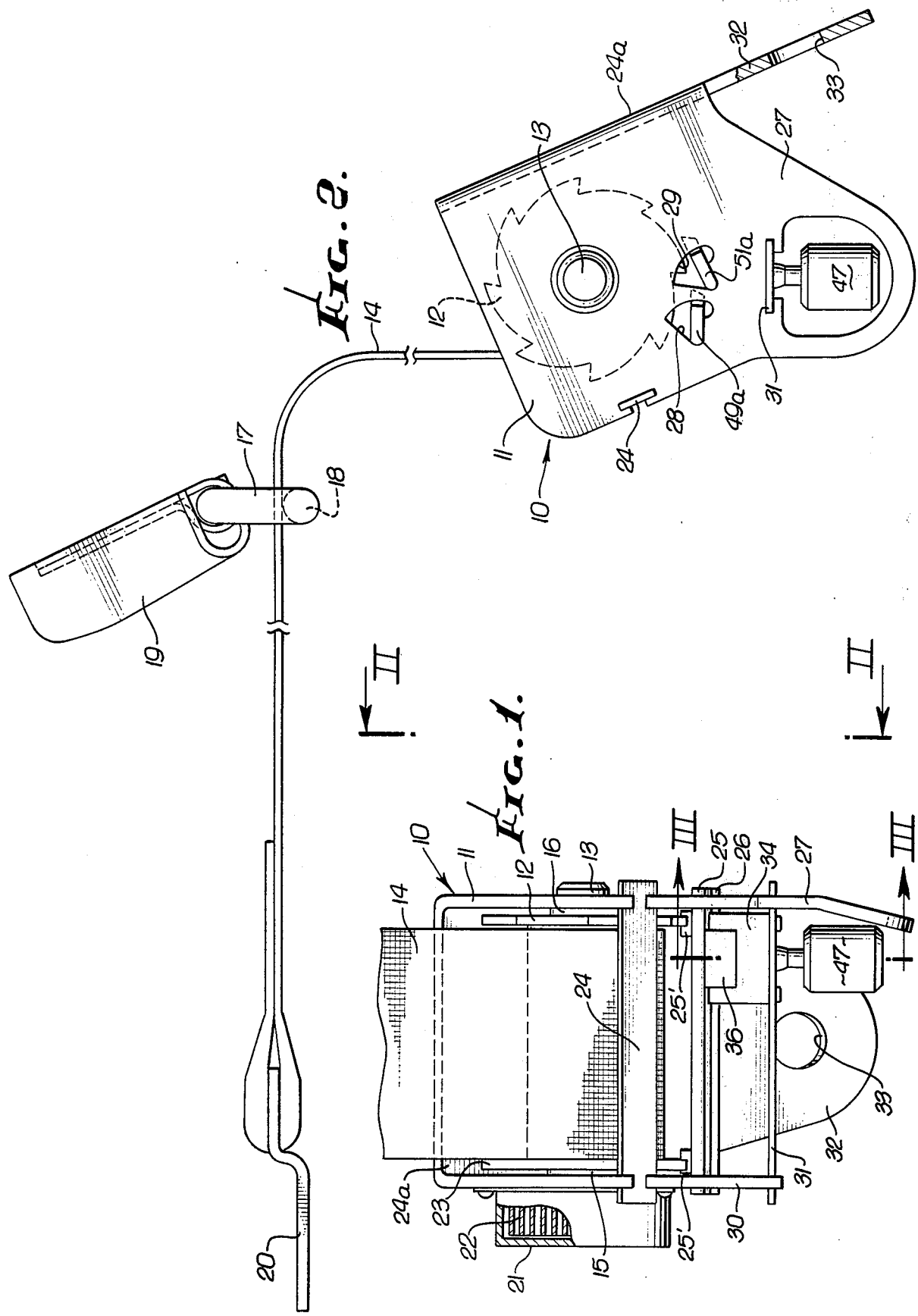

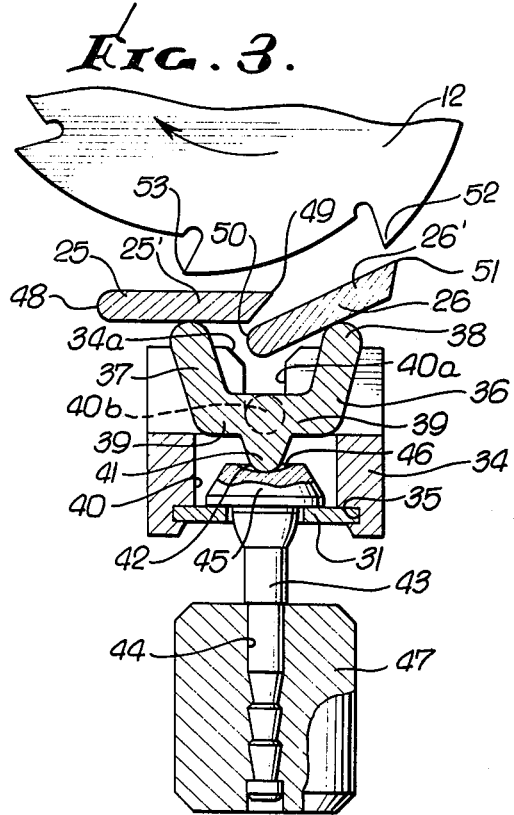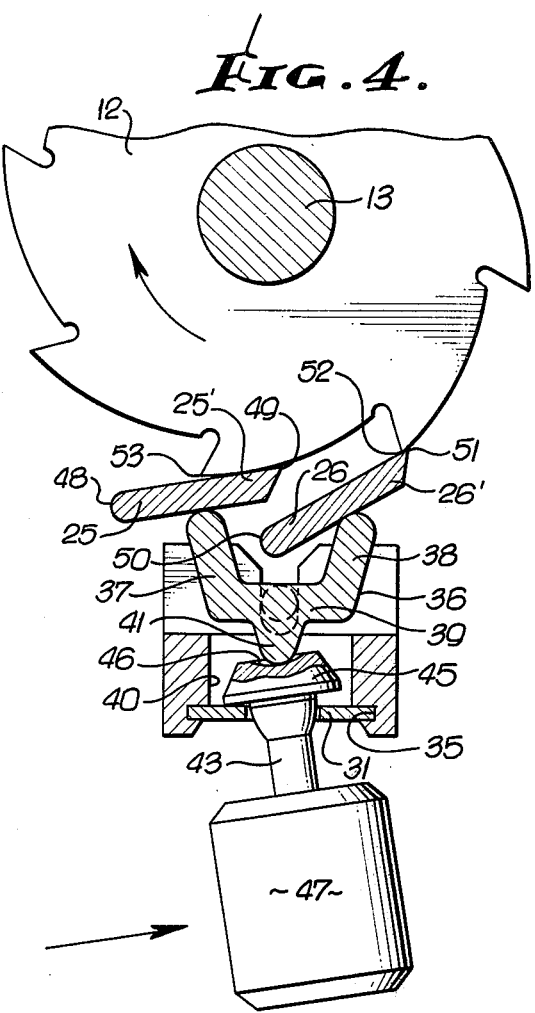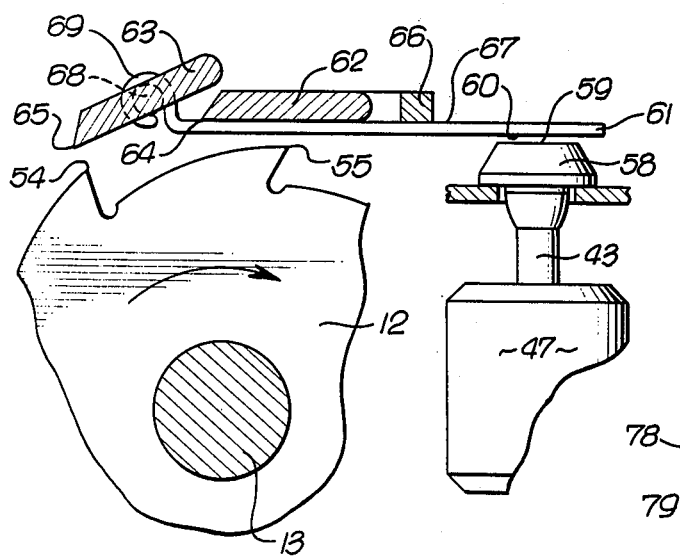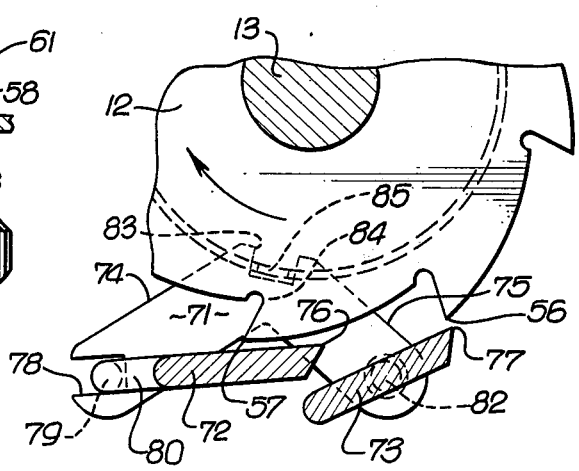

REEL FOR STORING BELTS OR THE LIKE

BACKGROUND OF THE INVENTION

1. Field of the Invention

The invention relates to inertia reels; and, more particularly, to inertia-actuated reels of the type upon which a belt or strap is stored.

2. Description of the Prior Art

It is well known in the prior art to use inertia reels for restraining and positioning an occupant of a seat on an airplane or in a vehicle or the like. Such reels are adapted to unreel the belt or strap to permit the occupant to lean forward or perform other limited activities. However, during a sudden deceleration of the vehicle or sudden forward movement by the occupant, such reels are adapted to restrain further unreeling therefrom for positive retention of the occupant to prevent injury thereto.

In certain inertia reel devices, spools from part of the device on which surplus belt or strap webbing is stored under spring tension. The restraint system of these devices is normally such that any extending webbing is subject to tension forces at the instant of vehicle impact or the like (which results in a sudden deceleration of the vehicle). In order to restrain the occupant of such vehicles, the unreeling of further webbing is prevented by locking the spool to the frame of the device.

This locking may be achieved by the engagement of a pawl with a ratchet wheel torsionally connected to the spool. The pawl may be urged into engagement by a mechanism which either senses deceleration of the vehicle in the emergency which results, or by the movement of the webbing from the spool as the occupant is thrown forward. In either case, the spool is spinning at the time the pawl is to engage with the ratchet wheel.

In such cases, the first contact between the pawl and the tooth of the ratchet may be tip to tip. At the time this contact occurs, shortly after vehicle impact, the spool is accelerating rapidly, and the kinetic energy of the occupant provides a considerable potential to place heavy loads through the belt and the ratchet wheel on to the pawl. If the radial engagement of the pawl with the ratchet tooth is small, the tooth tip may shear and propel the pawl violently out of engagement. The sudden release of belt tension when this happens, and the continuing forward movement of the occupant relative to the vehicle, causes the spool speed to increase even further, and time intervals between the ratchet teeth passing the pawl tip become too short for subsequent engagements to take place. In such cases, the result is catastrophic in that the restraint system totally fails to function.

In U.S. Pat. Nos. 2,923,492 and 3,386,683, to Walpole et al and Howland, respectively, it is suggested to use a series of latching pawls to engage a toothed wheel attached to and rotating with the spindle of a winding drum. The multiple pawl structure of both patents is substantially the same and, in both cases, the pawls are located so that they engage the teeth of the toothed wheel. Thus, in FIG. 3 of Walpole, et al, for example, the inertia operated pawls 42 are in cocked position (Col. 3, 11 62–65). FIG. 5 shows the inertia pawls 42 in released position. The uppermost pawl 42 has its tip engaging one of the teeth of wheel 40. At the same time, the lowermost pawl 42 is in position to engage a succeeding tooth on wheel 40. However, if the uppermost pawl 42 were to engage the outer tip of its respective wheel tooth, the lowermost pawl 42 might be too close to its respective wheel tooth to engage it in time should the uppermost pawl fail to engage. Thus, the Walpole et al system might fail if the tip of the tooth of the ratchet wheel is broken off when contacted by its respective pawl tip.

SUMMARY OF THE INVENTION

It is an object of this invention to provide a restraint system for an inertia reel of the like which will operate effectively to lock a rapidly accelerating spool in the frame of such reels to prevent unreeling of further seat or belt webbing therefrom.

It is a further object of this invention to provide a safeguard for such systems in the form of a pair of locking pawls so that if one of the pawls fails to properly engage the teeth of the ratchet gear, the other pawl is favorably placed to so engage the gear.

It is still further object of this invention to carry out the foregoing objects using a differential system so that if one pawl should ricochet out of engagement with the gear, the differential system automatically will provide extra impetus to engage the other pawl.

These and other objects are preferably accomplished by providing an inertia actuated reel on which seat belts are stored about a rotatable shaft. The reel includes spring means for retracting the belt and a ratchet tooth gear fixed for rotation with the shaft. Upon rapid unreeling of the belt off of the shaft, inertia responsive means activates a pair of lockbars to engage the ratchet tooth gear and stop its rotation. Each lockbar includes a pawl tip and when one of the pawl tips is radially aligned with one of the tooth tips on the gear, the other of the pawl tips is aligned midway between a pair of adjacent gear teeth. When the lockbars are moved into engagement with the ratchet tooth gear, the combination of the two pawl tips and their orientation with respect to the teeth of the gear assures that at least one of the tips will be in proper position to engage the tooth gear should the other tip break off or not engage upon contact with the gear.

BRIEF DESCRIPTION OF THE DRAWING

FIG. 1 is a vertical view, partly in section, of an inertia actuated reel in accordance with the invention;

FIG. 2 is a side view of the reel of FIG. 1 showing the belt fully extended therefrom;

FIG. 3 is a cross-sectional view of a portion of the mechanism of the reel of FIGS. 1 and 2;

FIG. 4 is a view similar to FIG. 3 showing the engagement of the ratchet gear of the reel of FIGS. 1 and 2 by the lockbars of FIG. 3;

FIG. 5 is a cross-sectional view of a modification of the means for locking the ratchet gear of the reel of FIGS. 1 through 4;

FIG. 6 is a cross-sectional view of a further modification of the means for locking the gear of the reel of FIGS. 1 through 4;

DESCRIPTION OF THE PREFERRED EMBODIMENT

Figure 7:
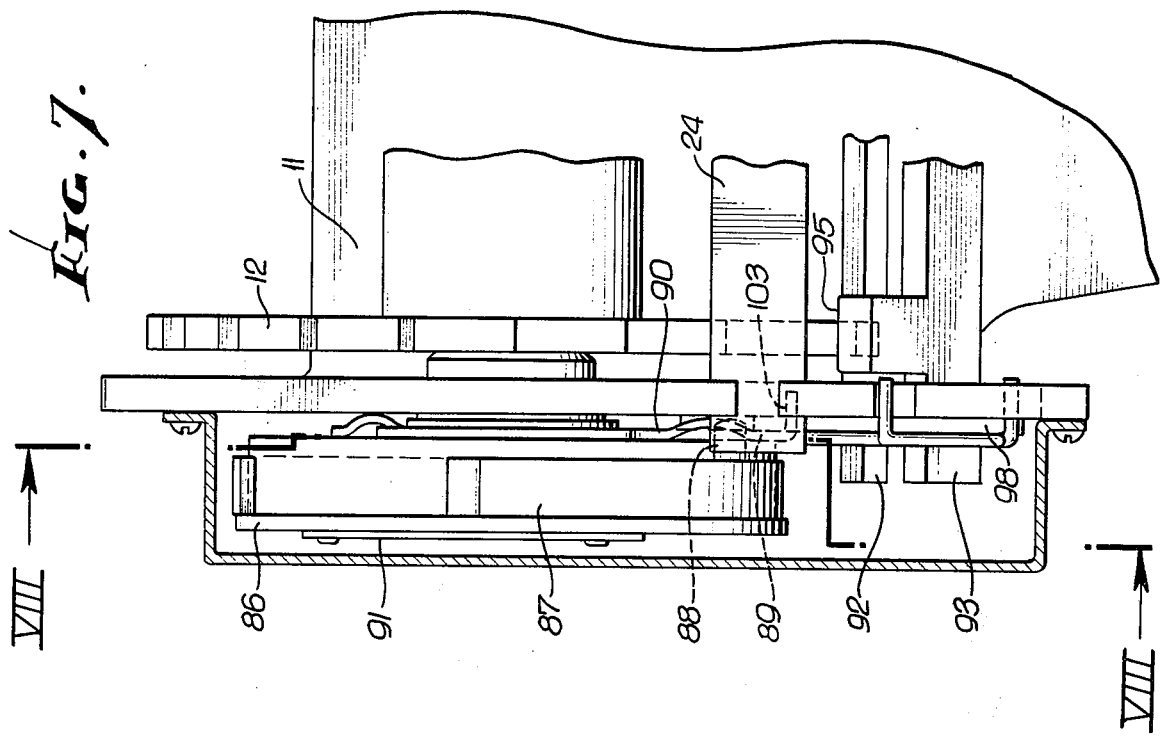
FIG. 7 is a partial vertical view of another modification of the means for locking the gear of the reel of FIGS. 1 through 4.

Referring now to FIG. 1 of the drawing, an inertia reel 10 in accordance with the invention is shown as having a frame 11 and a ratchet wheel 12 fixedly secured and coaxially attached to a main shaft 13 (see also FIG. 2). Webbing 14 winds and unwinds about shaft 13 so that it can be selectively retracted from and wound into the reel 10 as is well known in the art.

Shaft 13 is journalled for rotation within frame 11 by means of bearings 15, 16 disposed on each end of shaft 13 and rotatably mounted within frame 11.

As can be seen in FIG. 2, webbing 14 is in its fully extended position and passes through a guide 17 having a roller 18 therein (see the dotted lines in FIG. 2) for reducing the friction on webbing 14, which may be of nylon or other suitable material, as it is pulled therethrough. A cover 19 may be pivotally connected to guide 17 so that the reel 10 may be enclosed by cover 19 when webbing 14 is retracted therein. The free end of webbing 14 terminates in a connector 20 for connecting webbing 14 to a complementary locking member (not shown) which may be mounted on the vehicle or from a portion of a similar webbing arrangement.

Referring once again to FIG. 1, a conventional spring cup assembly 21 is shown on one side of frame 11. Assembly 21 is to be understood as housing therein a suitable torsion spring 22 or the like interacting between the shaft 13 and frame 11 to normally wind in or retract the webbing 14. A suitable arrangement which may be used is disclosed in U.S. Pat. No. 3,074,761 to Ryan.

A guide flange 23 is disposed between the inside of frame 11 and webbing 14 so that a guide is formed between flange 23 and ratchet wheel 12 as it is pulled out of frame 11. A support member 24 extends across the reel 10 between the sides forming frame 11 as shown. Flange 23 may also include suitable spaced gear teeth thereon.

As particularly contemplated within the present invention, locking means for locking ratchet wheel 12 are provided. In the exemplary embodiment, such locking means comprises a pair of elongated lockbars 25, 26 mounted on frame 11 (see also FIG. 3). As shown in FIG. 2, the sidewall 27 of frame 11 includes a pair of openings 28, 29. As can be seen by comparing FIGS. 1 and 2, lockbars 25, 26 are longer than the overall width of frame 11 and may have reduced ends 49a, 51a, respectively, extending out of openings 28, 29 (the openings in the opposite sidewall 30 of frame 11 are not visible in FIG. 2). The novel features of lockbars 25, 26 will be described in more detail further hereinbelow.

A bracket member 31 extends across the bottom of frame 11 between sidewalls 27, 30. As can be seen in FIG. 2, a back plate 24a, having a mounting flange 32 with an aperture 33 therein, is also mounted on frame 11 between sidewalls 27, 30 as shown for mounting reel 10 at any desired location of a vehicle or the like. A housing 34 is mounted on bracket member 31 by any suitable means, such as by slots 35 therein which receive the bifurcated end of bracket member 31 as clearly shown in FIG. 3.

As particularly contemplated within the present invention, differential lever means are provided for moving the lockbars into position to engage ratchet wheel 12. In the exemplary embodiment, such differential lever means comprises a toggle member 36, which, as shown in FIG. 3, includes a pair of spaced, generally upwardly and outwardly extending arms 37, 38 integral with a base portion 39. The housing 34 includes a generally axially extending aperture 40 for receiving therein a downwardly extending button member 41 integral with the underside of base portion 39. As can be seen in FIG. 3, button member 41 is tapered, as at surface 42, on the underside thereof for reasons to be discussed further hereinbelow.

The differential lever means for locking ratchet wheel 12 also includes a weighted element 47 having an actuator 43 fixedly secured within an axially extending aperture 44 in element 47. Actuator 43 carries an enlarged head portion 45 at the upper end thereof which is retained within housing 34 by means of bracket member 31 as shown in FIG. 3. The upper surface of head portion 45 is depressed to form a concave cavity 46. As shown in FIG. 3, the tapered surface 42 of button member 41 sits in cavity 46 and, as will be explained shortly, moves thereon when element 47 is shifted. Finally, housing 34 includes undercut portions 34a at the top thereof so that lockbars 25, 26, which are in engagement with arms 37, 38 of toggle member 36, are movable into a slotted opening 40a in housing 34. A pin 40b (shown in dotted lines) may be integral with member 36 and movable in opening 40a.

As shown in FIGS. 3 and 4, lockbar 25 may be generally rectangular in cross-section with end 48 rounded off as shown and the other end 49 tapering generally to a point. In like manner, lockbar 26 may be rounded off at the end 50 adjacent the tapered end 49 of lockbar 25 and tapered to a point at the end 51 remote from its rounded-off end 50. Referring once again to FIG. 2, the openings 28, 29 are generally triangular with rounded-off apices for receiving the respective rounded-off ends 48, 50 of lockbars 25, 26. The reduced ends 49a, 51a of lockbars 25, 26 are thus movable within their respective openings 28, 29 along the sides opposite the apices and retained by the walls forming openings 28, 29.

Each of lockbars 25, 26 includes a pair of spaced locking pawls 25', 26' so located with respect both to each other and to wheel 12 on reel 10 that when one pawl tip (i.e., the tapered ends 49, 51) is radially in line with a ratchet tooth tip, the other pawl tip is situated midway between two ratchet tooth tips. This is clearly shown in FIG. 4 where a portion of ratchet wheel 12 is shown. When pawl tip 51 is radially in line with tooth tip 52 of ratchet wheel 12, the other pawl tip 49 is situated generally midway between ratchet tooth tips 52 and 53. When it is required to lock ratchet wheel 12 and thus shaft 13, the pawls 25', 26' are simultaneously urged into engagement by the two points or arms 37, 38 of toggle member 36. The third point on the member 36, i.e., button member 41, may be actuated by the movement of element 47 which is in effect a vehicle deceleration sensing pendulum. That is, when element 47 is shifted or moved due to rapid vehicle deceleration, head portion 45 of actuator 43 rocks button member 41 within cavity 46 to thus move toggle member 36 within opening 40a as clearly illustrated in FIG. 4.

When member 41 is thus activated to lock ratchet wheel 12, a tip-to-tip contact may occur as described hereinabove at one locking pawl. That is, if wheel 12 is rotating in the direction of the arrow, the tips 51 of lockbars 26' may engage tooth 52 of wheel 12 (and also the teeth of flange 23, not visible). However, should the tip-to-tip contact fail or break, the other lockbar 26 is in position for engagement with the tooth 52. That is, pawl tips 49 of pawls 25' are automatically opposite a space between the teeth 52 and 53 of wheel 12 and thus favorably placed to engage the next succeeding tooth of wheel 12 (i.e., tooth 52). Further-more, if one pawl tip should slip or ricochet out of engagement, it will, through means of the differential level or toggle member 36, automatically provide extra impetus to engage the other pawl tip. Thus, the lever means forces the second tip into engagement with the teeth of wheel 12 should the first tip slip or ricochet out of engagement.

The aforementioned differential lever means for providing the third point of movement for lockbars 25, 26 may vary. For example, as shown in FIG. 5, the point of engagement of wheel 12 by the pawls 25', 26' may be at the top thereof rather than the bottom as described hereinabove with respect to FIGS. 1 through 4. In this embodiment, wherein like numerals refer to like parts of FIGS. 1 through 4, the head portion 58 of actuator 43 need not have an upper cavity (as cavity 46). The upper surface 59 thereof bears against the lower surface 60 of a reversing lever 61. A pair of pawls 62, 63, having tapered pawl points 64, 65, respectively, are fixedly connected to lever 61. This may be accomplished by providing a bracket member 66 fixedly connected to the upper surface 67 of lever 61 and having pawl 62 secured thereto. Pawl 63 may be fixedly secured by pin 68 to a curved end portion 69 of lever 67 as shown.

The lever 61 may be held within frame 11 by any suitable means with openings, similar to openings 28, 29, provided therein for pawls 62, 63 as described hereinabove with respect to FIGS. 1 through 4.

It is to be understood that when lever 61 is moved by element 47, i.e., by the engagement of head portion 58 with the surface 60 thereof, the lever 61 moves to pivot pawls 62, 63 into engagement with the teeth of ratchet wheel 12 (and of course flange 23, not visible). As shown in FIG. 5, pawl tip 65 is about to engage tooth 54 of wheel 12 while pawl tip 64 is generally midway between teeth 54 and 55 as previously described.

Referring now to FIG. 6 wherein like numerals once again refer to like parts of FIGS. 1 through 4, the means for locking ratchet wheel 12 may include a bellcrank lever 71 carrying pawls 72, 73 on each arm 74, 75 thereof. Pawls 72, 73 are configured as previously described and also include tapered pawl tips 76, 77 respectively. Any suitable means may be provided for securing pawls 72, 73 (which may be portions of suitable lockbars as discussed hereinabove) to bellcrank lever 71, such as by providing a slot 78 in arm 74, which slot 78 receives therein a pin 79. A bracket member 80 is fixedly secured to pin 79 and pawl 72 is connected thereto by any suitable means. The other pawl 73 is fixedly secured to a pin 82 carried by the other arm 75. The point-to-point contact of pawl tips 76, 77 with the teeth of ratchet wheel 12 is clearly shown in FIG. 6. Thus, tip 77 is radially aligned with tooth 56 while tip 76 is generally midway between the teeth 56 and 57.

Any suitable means may be used for imparting motion to lever 71. Thus, a slot 83 may be provided in the main body portion 84 of lever 71. A plate 85 may be movable within slot 83 and adapted to engage the sides forming slot 83. Plate 85 may be webbing sensitive, i.e., responsive to rapid unreeling of webbing 14 from shaft 13 as is well known in the seat belt art. Thus, as plate 85 is moved, lever 71 is moved to thus move the pawl tips 76, 77 of pawls 72, 73 into engagement with the teeth of ratchet wheel 12 (and flange 23) all as previously described. The various elements described hereinabove with respect to FIG. 6 may be mounted in frame 11 in any suitable manner with openings, similar to openings 28, 29 located for accommodating the lockbars of pawls 72, 73.

Figure 8:
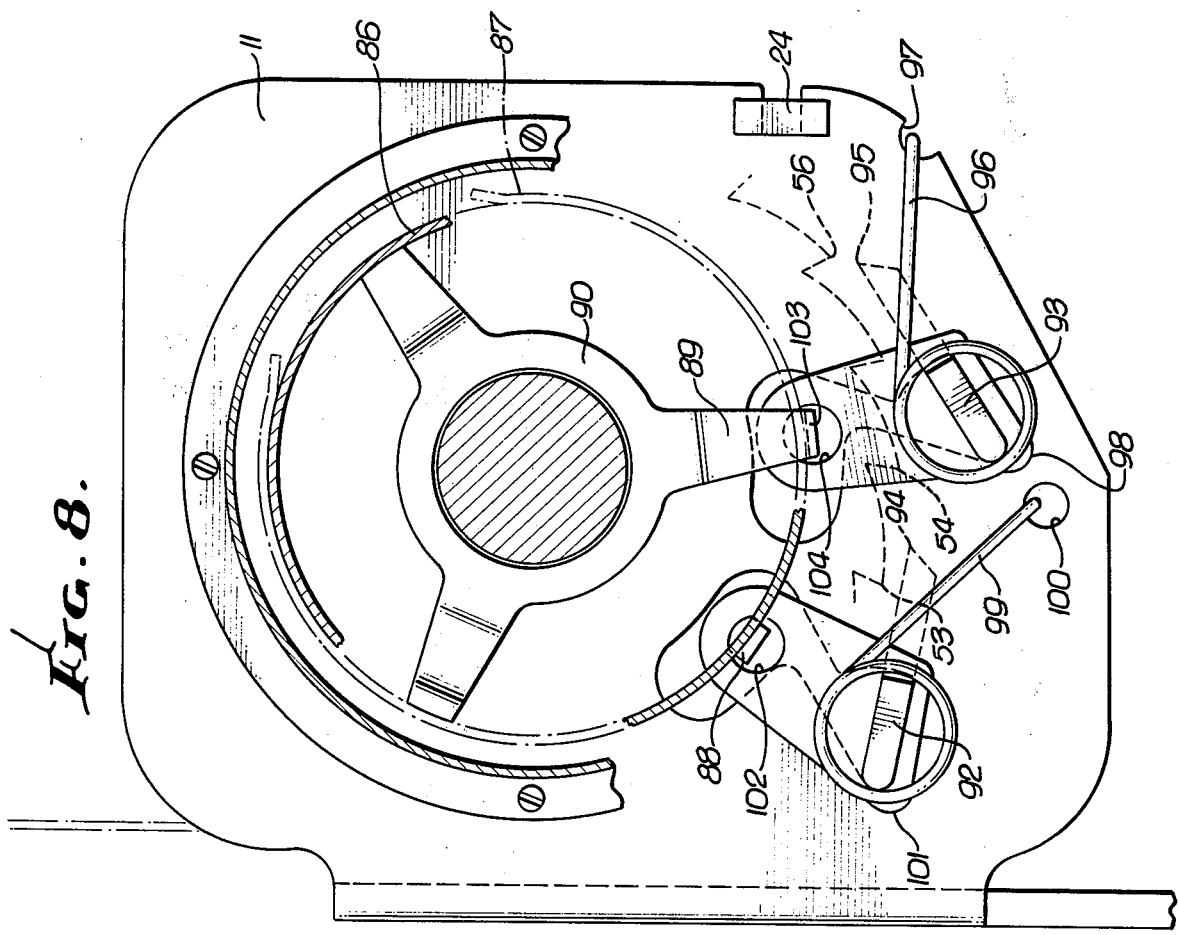
FIG. 8 is a view taken along the lines VIII—VIII of FIG. 7.

As shown in FIGS. 7 and 8, a final alternative means for locking ratchet wheel 12 is shown. A cup 86 is mounted on the side of frame 11 opposite spring cup assembly 21. Again, like numerals refer to like elements of FIGS. 1 through 4. A split ring clutch 87 extends about the periphery of cup 86 as shown. Clutch 87 includes an inwardly extending protuberance 88 (see FIG. 7) for reasons to be described shortly and a spider-like washer clutch 90 is retained within frame 11 between cup 86 and the interior of reel 10. A mounting plate 91 may be used to secure the cup 86 and clutches 87, 90 in position on frame 11.

A pair of lockbars 92, 93 (similar to the lockbars previously described) having pawls with tips 94, 95 are mounted on frame 11 below ratchet wheel 12. A pawl spring is associated with each lockbar 92, 93. Thus, spring 96 has one end secured within a cut-out portion 97 of frame 11, then extends about a twopiece lever arm 98 (see also FIG. 8) carrying lockbar 93. In like manner, a second pawl spring 99 is secured at one end within an opening 100 in frame 11, then extends about a two-piece second lever arm 101 carrying lockbar 92.

The aforementioned protuberance 88 extends into an aperture 102 of lever arm 101. Arm 89 of clutch 90 includes an extension portion 103 (see also FIG. 7) which extends into an aperture 104 formed in arm 98.

It is to be understood that conventional inertial means may be connected to cup 86 for determining sudden extension of webbing 14 and thus rotating cup 86. Force of rotation of cup 86 is then transmitted through clutches 87, 90 to lockbars 92, 93 which are rotated against the tension of springs 96, 99 and engage the teeth of ratchet wheel 12. If the pawl tips 94, 95 are positioned so that, if one pawl tip hits the tip of one of the teeth of wheel 12 thereby preventing that pawl tip from engaging its respective ratchet wheel tooth, the other pawl tip will be free to engage one of the other teeth. That is, as shown in FIG. 8, pawl tip 95 is about to engage tooth 56 while pawl tip 94 is about midway between teeth 53 and 54. When lockbars 92, 93 are moved to the dotted line position, as previously described, the tips 94, 95 will engage the teeth of ratchet wheel 12 in the manner described hereinabove with respect to FIGS. 1 through 6. It is to be understood that all of the foregoing discussions relating to the engagement of wheel 12 are also applicable to the engagement of guide flange 23.

It can be seen from the foregoing that an emergency locking system has been described for use with seat belt systems or the like. Dynamic failure usually encountered in such systems is minimized by the use of a differential mechanism which moves a pair of locking pawls into locking engagement with the ratchet wheel of the system. The use of a pair of pawls actuated by such mechanisms makes for a more reliable seat belt system.

I claim:

1. A reel for storing a belt or the like thereon comprising:

a frame having a shaft journalled for rotation thereon;

a belt having one end connected to said shaft and adapted to be wound about said shaft;

spring means associated with both said shaft and said frame to revolve said shaft in a direction retracting said belt about said shaft;

a ratchet tooth gear circumferentially mounted on said shaft and rotatable therewith, said ratchet tooth gear having a plurality of spaced teeth thereon extending in the direction opposite the direction of revolution of said shaft by said spring means; and means mounted on said frame for stopping the rotation of said shaft in the direction opposite the direction of revolution of said shaft by said spring means, said means including a pair of lockbars mounted on said frame, each of said lockbars having a pawl tip movable from a first position out of engagement with said ratchet tooth gear in a direction generally normal to the axis of rotation of said gear to a second position in engagement therewith, said pawl tips in said second position being spaced such that when the pawl tip of one of said lockbars is generally radially aligned with one of the teeth of said ratchet tooth gear the other of said pawl tips of the other of said lockbars is aligned midway between a pair of adjacent gear teeth of said ratchet tooth gear, said means mounted on said frame including differential lever means operatively engaging said lockbars for moving said lockbars between said first and second positions, said lever means having first and second portions thereon engaging each of said lockbars and a third portion thereon, and means associated with said frame operatively engaging said third portion to actuate said lever means in a manner whereby said lever means moves said lockbars between said first and second positions, said last-mentioned means moving to a lever means actuating position in response to inertia acting on said last-mentioned means and said differential lever means including a toggle member having a base member including said first, second and third portions thereon, said first and second portions being a pair of generally upwardly extending spaced arms with one of said arms bearing against the bottom of one of said lockbars and the other of said arms bearing agains the bottom of the other of said lockbars, and said third portion includes a downwardly extending button member generally rounded off at its lowermost end, said inertia responsive means including a weighted member having an integral upper head portion with a cavity on its upper surface, the roundedoff portion of said button member resting on said cavity and being movable thereon when said weighted member is moved between positons actuating said lever means.

2. The reel of claim 1 wherein said lockbars extend longitudinally of said frame and generally parallel to the axis of said shaft, said frame having a pair of sidewalls thereon and at least a pair of spaced openings in each of said sidewalls, the opposite ends of said lockbars extending out of said openings, each of said openings including means for guiding their respective lockbars as each lockbar moves between its first and second positions.

3. In a reel having a frame, a shaft journaled for rotation in said frame, a belt having one end connected to said shaft and adapted to be wound about said shaft, spring means associated with both said shaft and said frame for revolving said shaft in a direction retracting said belt about said shaft, a ratchet tooth gear circumferentially mounted on said shaft and rotatable therewith, said ratchet tooth gear having a plurality of spaced teeth thereon extending in the direction opposite the direction of revolution of said shaft by said spring means, the improvement which comprises:

means mounted on said frame for stopping the rotation of said shaft in the direction opposite the direction of revolution of said shaft by said spring means, said means including a pair of lockbars mounted on said frame, each of said lockbars having a pawl tip movable from a first position out of engagement with said ratchet tooth gear in a direction generally normal to the axis of rotation of said gear to a second position in engagement therewith, said pawl tips in said second position being spaced such that the pawl tip of one of said lockbars is generally radially aligned with one of the teeth of said ratchet tooth gear and the pawl tip of the other of said lockbars is disposed in the space on said ratchet tooth gear formed between a pair of adjacent teeth thereon, said means mounted on said frame further including differential lever means independent of said lockbars and operatively engaging said lockbars for moving said lockbars between said first and second positions, said lever means having first and second spaced portions thereon engaging each of said lockbars and a third portion thereon, spaced from said first and second portions, and means associated with said frame operatively engaging said third portion to actuate said lever means in a manner whereby said lever means simultaneously moves both of said lockbars between said first and second positions, the first portion of said differential lever means continually bearing against the bottom of one of said lockbars and said second portion continually bearing against the bottom of the other of said lockbars.

4. In the reel of claim 3 wherein said means associated with said frame to actuate said lever means includes a pendulum and itself constitutes an inertia member.

5. In the reel of claim 4 wherein said differential lever means includes a toggle member having a base member, said first and second portions including a pair of generally upwardly extending spaced arms with one of said arms bearing against the bottom of one of said lockbars and the other of said arms bearing against the bottom of the other of said arms bearing against the bottom of the other of said lockbars.

6. In the reel of claim 3 wherein said third portion includes a downwardly extending button member generally rounded off at its lowermost end, said inertia member includes an integral upper head portion with a cavity on its upper surface, the rounded-off portion of said button member resting on said cavity and being movable thereon when said inertia member is moved between positions actuating said lever means.

7. In a reel having a frame, a shaft journalled for rotation in said frame, a belt having one end connected to said shaft and adapted to be wound about said shaft, spring means associated with both said shaft and said frame for revolving said shaft in a direction retracting said belt about said shaft, a ratchet tooth gear circumferentially mounted on said shaft and rotatable therewith, said ratchet tooth gear having a plurality of spaced teeth thereon extending in the direction opposite the direction of revolution of said shaft by said spring means, the improvement which comprises:

means mounted on said frame for stopping the rotation of said shaft in the direction opposite the direction of revolution of said shaft by said spring means, said means including a pair of lockbars mounted on said frame, each of said lockbars having a pawl tip movable from a first position out of engagement with said ratchet tooth gear to a second position in engagement therewith, said means mounted on said frame further including differential lever means independent of said lockbars and operatively engaging said lockbars for moving said lockbars between said first and second positions, said lever means having first and second spaced portions thereon engaging each of said lockbars and a third portion thereon spaced from said first and second portions and means associated with said frame operatively engaging said third portion to actuate said lever means in a manner whereby said lever means simultaneously moves both of said lockbars between said first and second positions, the first portion of said differential lever means continually bearing against the bottom of one of said lockbars and said second portion continually bearing against the bottom of the other of said lockbars.

8. In the reel of claim 7 wherein said means associated with said frame to actuate said lever means includes a pendulum and itself constitutes an inertia member.

9. In the reel of claim 8 wherein said differential lever means includes a toggle member having a base member, said first and second portions including a pair of generally upwardly extending spaced arms with one of said arms bearing against the bottom of one of said lockbars and the other of said arms bearing against the bottom of the other of said lockbars.

10. In the reel of claim 9 wherein said third portion includes a downwardly extending button member generally rounded off at its lowermost end, said inertia member includes an integral upper head portion with a cavity on its upper surface, the rounded-off portion of said button member resting on said cavity and being movable thereon when said inertia member is moved between positions actuating said lever means.

11. In a reel having a frame, a shaft journalled for rotation in said frame, a belt having one end connected to said shaft and adapted to be wound about said shaft, spring means associated with both said shaft and said frame for revolving said shaft in a direction retracting said belt about said shaft, a ratchet tooth gear circumferentially mounted on said shaft and rotatable therewith, said ratchet tooth gear having a plurality of spaced teeth thereon extending in the direction opposite the direction of revolution of said shaft by said spring means, the improvement which comprises:

means mounted on said frame for stopping the rotation of said shaft in the direction opposite the direction of revolution of said shaft by said spring means, said means including a pair of lockbars mounted on said frame, each of said lockbars having a pawl tip movable from a first position out of engagement with said ratchet tooth gear in a direction generally normal to the axis of rotation of said gear to a second position in engagement therewith, said means mounted on said frame further including differential lever means unconnected to said lockbars and independently movable with respect thereto and operatively engaging said lockbars for moving said lockbars between said first and second positions whereby said lever means simultaneously moves both of said lockbars between said first and second positions.

12. In the reel of claim 11 further including a pendulum associated with said frame and which itself constitutes an inertia member operatively engaging said differential lever means and adapted to move said lever means to thereby move said lockbars between said first and second positions.

13. In the reel of claim 12 wherein said differential lever means includes a toggle member having a base member and first and second portions thereon comprising a pair of generally upwardly extending spaced arms respectively, with one of said arms bearing against the bottom of one of said lockbars and the other of said arms bearing against the bottom of the other of said lockbars.

14. In the reel of claim 13 wherein said toggle member further includes a third portion having a downwardly extending button member generally rounded off at its lowermost end, said inertia member including an integral upper head portion with a cavity on its upper surface, the rounded-off portion of said button member resting on said cavity and being movable thereon when said inertia member is moved between positions actuating said lever means.

* * * * *

UNITED STATES PATENT OFFICE
CERTIFICATE OF CORRECTION

Patent No. 3,944,162  Dated March 16, 1976

Inventor(s) Cyril Henderson

It is certified that error appears in the above-identified patent and that said Letters Patent are hereby corrected as shown below:

Column 8, line 48, "3" should read -- 5 --.

Signed and Sealed this twenty-fifth Day of May 1976

[SEAL]

Attest:

RUTH C. MASON
*Attesting Officer*

C. MARSHALL DANN
*Commissioner of Patents and Trademarks*